(12) United States Patent
Holt, Jr. et al.

(10) Patent No.: US 6,453,851 B1
(45) Date of Patent: Sep. 24, 2002

(54) ANIMAL RESTRAINT LEASH

(75) Inventors: Robert C. Holt, Jr., North Canton, OH (US); George R. Krohe, Alliance, OH (US)

(73) Assignee: Coastal Pet Products, Inc., Alliance, OH (US)

( * ) Notice: Subject to any disclaimer, the term of this patent is extended or adjusted under 35 U.S.C. 154(b) by 0 days.

(21) Appl. No.: 09/858,576

(22) Filed: May 17, 2001

(51) Int. Cl.[7] .............................................. A01K 27/00
(52) U.S. Cl. ...................................................... 119/795
(58) Field of Search ............................... 119/769, 774, 119/795, 796, 797; D30/153

(56) References Cited

U.S. PATENT DOCUMENTS

| | | | |
|---|---|---|---|
| 3,120,403 A | * 2/1964 | Molzan et al. | 119/769 |
| 3,332,398 A | 7/1967 | Mintz | 119/795 |
| 5,363,810 A | 11/1994 | Kraus | 119/795 |
| 5,649,504 A | 7/1997 | Culp | 119/795 |
| 5,701,848 A | * 12/1997 | Tozawa | 119/795 |
| 5,732,661 A | 3/1998 | Lagro | 119/795 |
| 6,237,539 B1 | * 5/2001 | Spron | 119/795 |

OTHER PUBLICATIONS

Coastal Pet Products, Inc.'s advertisement in "Pet Business", p. 111, Jul. 1999.
Hunter (German) brochure, 1 page, undated.

* cited by examiner

Primary Examiner—Charles T. Jordan
Assistant Examiner—Elizabeth Shaw
(74) Attorney, Agent, or Firm—Renner, Kenner, Greive, Bobak, Taylor & Weber

(57) ABSTRACT

An animal restraint leash (10) includes a lead (12) having a handle loop (20) formed at one end and a clasp (18) positioned at the other end to allow leash (10) to be attached to an animal. A grip member (22) is slidably received around the lead (12) and provides the user with a second grip area with which to maintain control over an animal's movements. The grip member (22) may be moved into various positions along the length of the lead (12), however, when a gripping force is applied to the grip member (22), preferably at the area of a depression (30), the grip member (22) will engage the lead (12) so as to maintain control over the animal. By sliding the grip member (22) to a desired position along the length of the lead (12) and then exerting a gripping force to the grip member (22), various control lengths of the animal restraint leash (10) may be maintained.

14 Claims, 2 Drawing Sheets

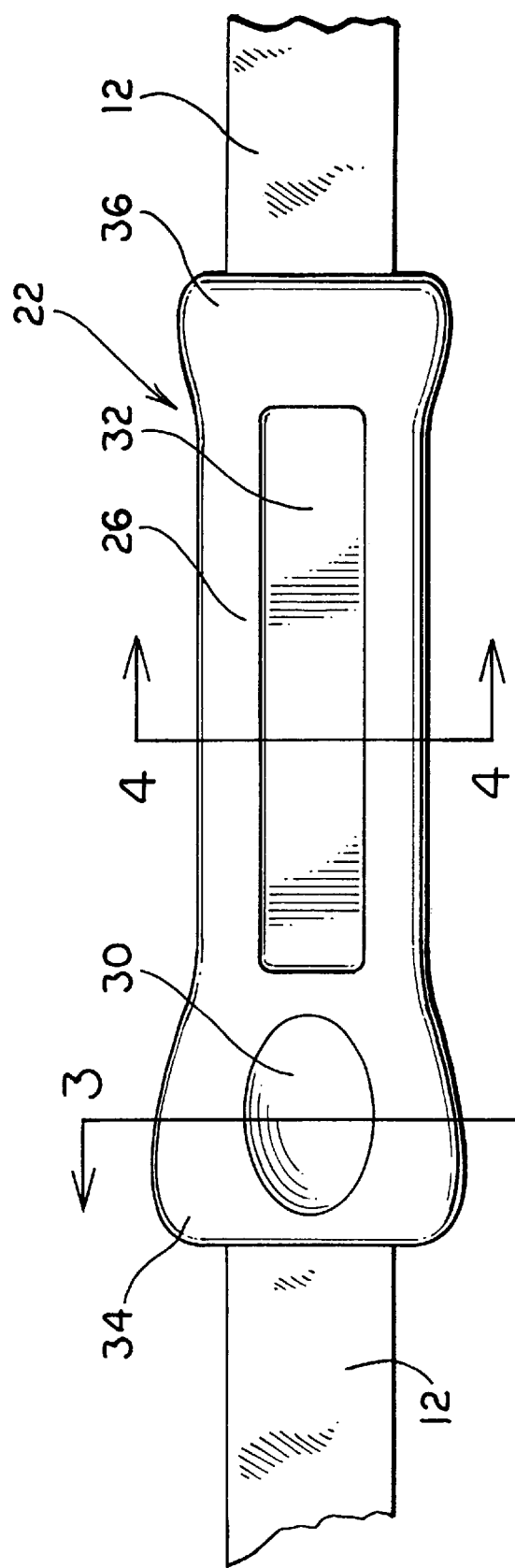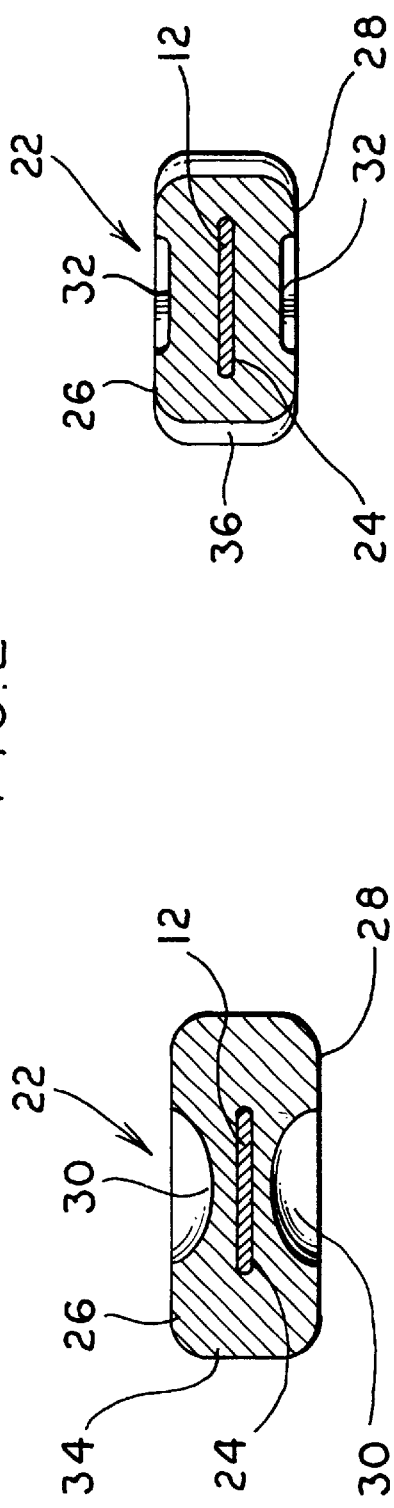

ANIMAL RESTRAINT LEASH

TECHNICAL FIELD

The present invention generally relates to a leash for animals. More particularly, the present invention relates to a leash having a secondary handle slidably positioned along the length of the leash to provide convenient, additional control of the animal.

BACKGROUND ART

The typical leash used to control a pet includes an elongated strap, or lead, having a clasp at one end which attaches to a pet's collar and a handle at the other end which the user grasps in order to control the pet attached to the leash. With these common leashes, the pet is free to move around an area defined by the length of the lead. When greater restriction of the pet's movement is required, such as when walking the pet along a busy street or a crowded walkway, or when another animal appears and makes the pet uneasy, the user often desires to have more control over the pet. One manner of doing so is to employ a second grip along the length of the lead in order to reduce the pet's freedom of movement and thereby keep the pet under control. Thus, the user will simply grab the lead at some point between the provided handle and the pet's collar. Also, the user may wrap the lead several times around his palm until the desired control length is attained. Both of these control methods may cause injury to the user, especially when attempting to control a large pet, because the pet may pull against the leash and cause a rope burn or other constriction of the hand.

The prior art devices which have attempted to address this problem, by providing alternative leash designs for controlling pets, are not without problems of their own. For example, U.S. Pat. No. 5,351,654 discloses a leash having multiple loops along the length of the lead. These loops are held in an open position by a resilient material so that they do not close up as a pet pulls the lead taut. The user may grasp any one of these loops thereby effectively shortening the length of the lead to provide better control over the pet. However, this design requires a large amount of material and stitching, and the effectiveness of the resilient material to keep the loops easily accessible to the user when a large, strong pet exerts considerable force on the leash is questionable at best.

U.S. Pat. Nos. 5,363,810 and 5,649,504 each disclose a leash having two handles, one located at the end of the lead for distant control of the animal and one located near the collar end of the lead for close control of the animal. The obvious disadvantage of these devices is that they provide only two options for control, a distant control equal to the length of the lead, and a close control in close proximity to the animal's collar. Such designs do not accommodate uses where an intermediate degree of control is desired. Also, in such leash designs, long leashes are impractical in that the user must be able to reach the close control handle in order for that handle to be of any practical benefit. When an animal is pulling against the user, it may be very difficult for the user to get close enough to the animal to grab the close control handle.

U.S. Pat. No. 5,732,661 discloses a grappler near the collar end of the lead, the grappler having ridges along its length to better accommodate and provide grip to the fingers of a grasping hand. Again, this grappler is permanently located far from the handle end of the leash and may be difficult to reach in situations where its use is most desired. Since the grappler is fixed in its position along the lead, no variable control leash length is contemplated.

Most recently, leashes have been provided with gripping devices which can be adjustably positioned along the length of the lead. These devices have been made of a leather or elastomeric material such that with a very light gripping force, they can slide along the leash to a desired position, and upon a hard gripping force, the device is compressed or deformed to engage the lead to control the pet. The difficulty with these devices is that the degree of grip must be carefully controlled. That is, if too light a grip is obtained when attempting to control the pet, the device will slide along, rather than engage, the lead. Conversely, when trying to adjust the length, if too firm a grip is established, the device will not slide along the lead.

Thus, the need exists for an improved animal restraint leash which allows the user to easily exert considerable control over the animal in situations where such control is needed. It is also desirable that the improved restraint leash allow the user to quickly and easily vary the control lengths employed to restrain the animal.

DISCLOSURE OF THE INVENTION

It is therefore an object of the present invention to provide an animal restraint leash with a grip member positionable along the length of the leash to provide the user with a handle whereby an adjustable degree of control can be maintained over the animal.

It is another object of the present invention to provide a restraint leash, as above, in which the grip member may be moved along the length of the leash by applying a grip to a portion thereof to provide the user with the ability to vary the control length to be maintained by the grip member.

It is yet another object of the present invention to provide a restraint leash, as above, wherein the grip member will maintain its position along the length of the leash when the user exerts a gripping force upon a portion of the grip member thereby engaging the leash.

It is a further object of the present invention to provide a restraint leash, as above, wherein the grip member provides a comfortable grip for the user.

These and other objects of the present invention, as well as the advantages thereof over existing prior art forms, which will become apparent from the description to follow, are accomplished by the improvements hereinafter described and claimed.

In general, an animal restraint leash made in accordance with the present invention includes an elongate lead having opposed ends, one end of which is adapted to be attached to the animal. A grip member is slidably received on the lead and has a first thickness and a second thickness which is thinner than the first thickness. When the grip member is gripped at the area of the second thickness, it engages the lead to facilitate control of the animal.

A preferred exemplary animal restraint leash incorporating the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 2 is an enlarged fragmented view of the area of the leash having the grip member of the present invention.

FIG. 3 is a sectional view taken substantially along line 3—3 of FIG. 2.

FIG. 4 is a sectional view taken substantially along line 4—4 of FIG. 2.

PREFERRED EMBODIMENT FOR CARRYING OUT THE INVENTION

Figure 1:
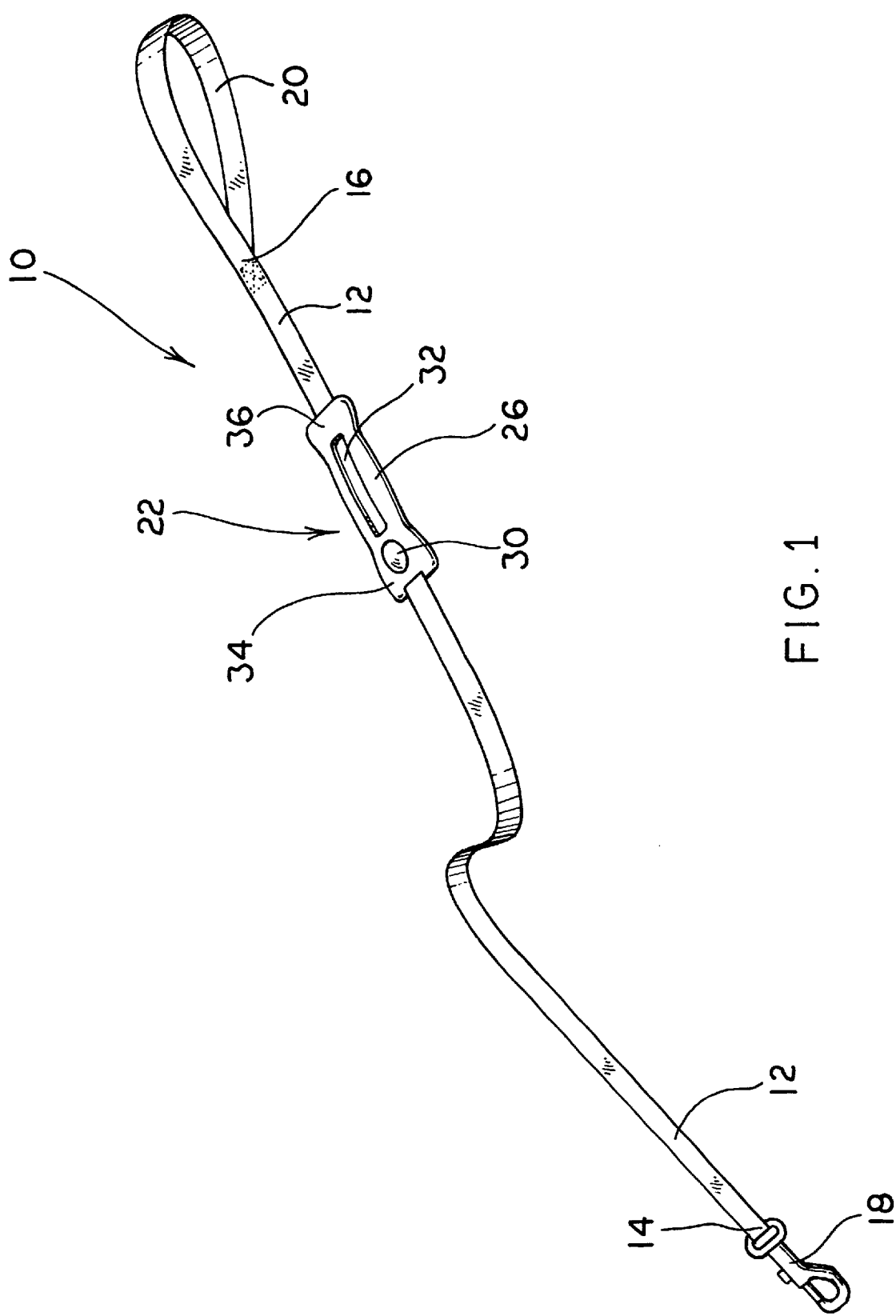
FIG. 1 shows a preferred embodiment of the animal restraint leash made in accordance with the present invention.

An animal restraint leash made in accordance with the present invention is generally indicated by the numeral 10, and includes an elongate lead 12 which can be a strap of material, preferably nylon, that is sufficiently strong to restrain an animal to be secured by restraint leash 10. Although lead 12 is preferably formed of nylon material, it should be understood that the present invention is not limited thereto.

Lead 12 includes a lead attachment end 14 and an opposed lead handle end 16. A means for connecting restraint leash 10 to an animal, such as preferably a clasp 18, may be readily attached to lead end 14 and can easily be attached to an animal's harness or collar. Devices such as clasp 18 are commonly provided on animal restraint leashes and animal harnesses, and pet collars usually include a metal ring to which devices like clasp 18 may be attached. However, it should be understood that practicing the present invention does not require the specific clasp 18, rather attachment end 14 may be provided with any means for attaching animal restraint leash 10 to an animal and fall within the scope of the present invention.

The handle end 16 of lead 12 is shown as having a loop 20 formed therein to create a handle so that the user may easily maintain a secure grip on restraint leash 10 in order to control the animal attached thereto. However, the present invention should not be limited to such a loop handle 20. Indeed, handle end 18 need not be provided with any special handle configuration to practice the present invention.

The improvement of the present invention resides in the provision of a grip member, generally indicated by the numeral 22, which is slidably received around lead 12. To that end, grip member 22 is provided with a slot 24 which extends along the length of grip member 22 and receives lead 12 therethrough. Thus, slot 24 is slightly larger than the profile of lead 12. In the instance of a rectangular lead 12, as shown, slot 24 is slightly larger in height and width than lead 12 so that grip member 22 may be slid to various positions along the length of lead 12. Preferably, the dimensions of slot 24 are such that, while grip member 22 may be manually moved along the length of lead 12, grip member 22 will maintain its last established position on lead 12.

Grip member 22 has upper and lower spaced outer surfaces 26 and 28, respectively, the spacing of which defines, generally, the greatest thickness of grip member 22. The upper and lower surfaces 26 and 28 of grip member 22 are provided with opposed depressions 30 which, as shown in FIG. 2, are preferably generally oval in configuration. Grip member 22 is thus thinner at the area of depressions 30 such that at that area, its outer surfaces are closer to lead 12. The upper and lower surfaces 26 and 28 of grip member 22 may also be provided with a second set of opposed depressions 32 which, as shown in FIG. 2, are preferably generally rectangular in configuration. Grip member 22 is thus thinner in the area of depressions 32, but not as thin as at the area of depressions 30. An enlarged flange 34 may be provided at the end of grip member 22 at the area of depressions 30, and another enlarged flange 36 may be provided at the opposite longitudinal end of grip member 22.

Grip member 22 is preferably made of a resilient or flexible elastomer or thermoplastic material such as thermoplastic rubber or the like. As such, when it is grasped by the user, it will provide a comfortable grip. Specifically in this regard, grip member 22 is intended to be gripped by the user around the central area thereof, that is, around the area of depressions 32. When the palm and fingers of the hand are in this position, the hand is comfortably maintained between enlarged end flanges 34 and 36. With only a light grip being necessary with the hand in this position, grip member 22 may be slid longitudinally along lead 12 to a desired position between lead ends 14 and 16 to define the desired amount of control over the animal attached to leash 10, that is, to control the amount (length) of lead 12 between grip member 22 and lead attachment end 14. The presence of end flanges 34 and 36 assist the user in this placement, that is, they allow grip member 22 to be engaged and easily slid along lead 12 without engaging lead 12.

The nature of the material of grip member 22 also enables the user to control the pet at that established length of lead 12. Thus, when the control maintained by grasping handle loop 20 is insufficient to control the animal attached to restraint leash 10, the user may grasp grip member 22 to restrict the animal's movement to the constraints of the shorter control length. To that end, by exerting a squeezing force on grip member 22, it will engage lead 12, thereby controlling the pet. Most conveniently, pressure may be applied to at least one of the depressions 30, as by the user applying pressure with his thumb. Because, as shown in FIG. 3, the surface of grip member 22 is close to lead 12 at the area of depressions 30, not a significant amount of force is needed to establish such control. As such, the force of a thumb is sufficient, and the user is induced to use his thumb for this purpose because of the generally oval shape of depressions 30 which basically conforms with the shape of one's thumb profile or print.

Grip member 22 may also be depressed by the palm of the hand and the fingers at the area of depressions 32. Because grip member 22 is thicker at that area than at the area of depressions 30, it may take a slightly greater force to engage the lead 20 at depressions 32. But since more force than would normally be exerted by a thumb can be exerted by the fingers and palm of one's hand, lead 20 may be readily engaged at this location. In fact, even if the largest thickness of grip member 22, as defined by surfaces 26 and 28, is squeezed with sufficient force, lead 12 can likewise be engaged to control the pet. However, it should be evident that the easiest and most convenient manner to engage lead 12 is by applying force at the area of one of the depressions 30.

The advantages of the moveable grip member 22 should be apparent. In instances when less freedom of movement of the animal is desired, the user may vary the control length maintained by grip member 22 from a longer length very near handle end 16 to a shorter length very near attachment end 14. Grip member 22 thus provides a comfortable second handle and diminishes the possibility of injury to the user.

In view of the foregoing, it should be evident that an animal restraint leash constructed as described herein, accomplishes the objects of the invention and otherwise substantially improves the art. While a preferred embodiment of the invention has been presented and described in detail, the invention is not limited thereto or thereby.

What is claimed is:

1. An animal restraint leash comprising an elongate lead having opposed ends, one of said ends being adapted to be attached to an animal, a grip member slidably received at a selected position on said lead, said grip member being of a first thickness and a second thickness thinner than said first thickness such that applying pressure to said grip member at an area of said second thickness causes said grip member to engage said lead to facilitate control of the animal.

2. An animal restraint leash according to claim 1 wherein said grip member includes a flange at one end thereof to assist in the sliding of said grip member along said lead.

3. An animal restraint leash according to claim 1 wherein said grip member includes a flange at the other end thereof to assist in the sliding of the grip member along said lead.

4. An animal restraint leash according to claim 1 wherein said grip member is made of an elastomeric compound.

5. An animal restraint leash according to claim 1 further comprising a handle formed at the other of said ends of said lead.

6. An animal restraint leash according to claim 5 further comprising means attached to said one of said ends of said lead for connecting the restraint to the animal.

7. An animal restraint leash according to claim 6 wherein said means for connecting is a clasp.

8. An animal restraint leash according to claim 1 wherein said grip member is provided with a slot, said lead being received in said slot.

9. An animal restraint leash according to claim 8 wherein the external dimensions of said lead are approximately the same as the internal dimensions of said slot.

10. An animal restraint leash according to claim 1 wherein said grip member engages said lead with a frictional force sufficient to maintain its position along the length of said lead when said grip member is not being utilized, the frictional force being slight enough to allow said grip member to be slid along the length of said lead through manual manipulation.

11. An animal restraint leash comprising an elongate lead having opposed ends, one of said ends being adapted to be attached to an animal, a grip member slidably received on said lead, said grip member including spaced upper and lower surfaces which define a first thickness which is the greatest thickness of said grip member, said grip member also including a depression in at least one of said surfaces to create a second thickness thinner than said first thickness such that applying pressure to said grip member at an area of said second thickness causes said grip member to engage said lead to facilitate control of the animal.

12. An animal restraint leash according to claim 11 wherein said depression is oval in shape to induce a user to utilize his thumb to apply pressure to said grip member.

13. An animal restraint leash comprising an elongate lead having opposed ends, one of said ends being adapted to be attached to an animal, a grip member slidably received on said lead, said grip member having a first thickness, a second thickness thinner than said first thickness, and a third thickness which is thicker than said second thickness but thinner than said first thickness, such that applying pressure to said grip member at an area of said second thickness causes said grip member to engage said lead to facilitate control of the animal.

14. An animal restraint leash according to claim 13 wherein depressions in said grip member create said third thickness.

\* \* \* \* \*